June 28, 1932.  L. D. SLADE  1,865,148
GEAR CUTTING TOOL
Filed April 1, 1930
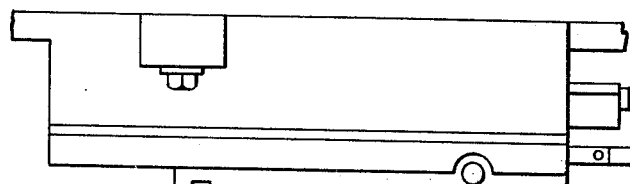
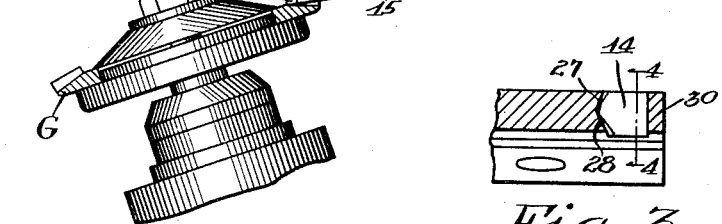
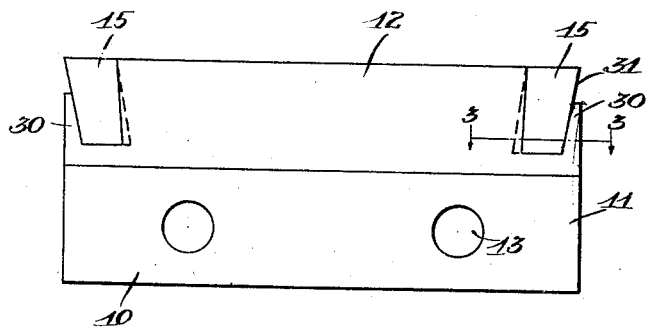
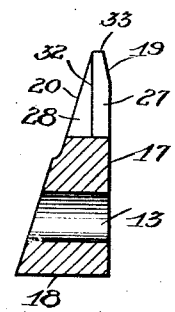
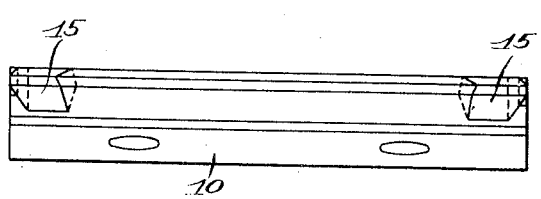
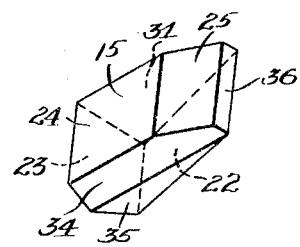
INVENTOR
Leon D. Slade
BY
his ATTORNEY Patented June 28, 1932

1,865,148

UNITED STATES PATENT OFFICE

LEON D. SLADE, OF ROCHESTER, NEW YORK, ASSIGNOR TO GLEASON WORKS, OF ROCHESTER, NEW YORK, A CORPORATION OF NEW YORK

GEAR CUTTING TOOL

Application filed April 1, 1930. Serial No. 440,841.

The present invention relates to cutting tools and particularly to tools for cutting gears and has for its primary object to provide an efficient yet non-costly cutting tool in which a cutting bit of a high-grade cutting material is employed as the cutting element and is secured in a non-cutting body or holder of a suitable, less expensive material.

A further object of this invention is to provide a composite cutting tool where the holder and bit are so shaped to interengage with each other that the bit is held securely against movement sidewise in either direction and the cutting thrusts on the tool serve only to seat the bit more securely in the holder.

This construction is of especial advantage in producing reciprocating tools for roughing gears where the cutting bit must have two side cutting edges and the pocket in the holder in which the bit is secured must extend transversely across the full width of the holder.

Other objects of this invention will be apparent hereinafter from the specification when taken in conjunction with the drawing and the recital of the appended claims.

In the drawing:

Figure 1 is a plan view and Figure 2 a side elevation of a straight tooth bevel gear roughing tool constructed according to a preferred embodiment of this invention;

Figure 3 is a fragmentary sectional view of the tool. This section is such as might be taken on the line 3—3 of Figure 1 with the cutting bit removed;

Figure 4 is a sectional view on the line 4—4 of Figure 3, looking in the direction of the arrows;

Figure 5 is a perspective view of the cutting bit; and

Figure 6 is a fragmentary plan view showing how the gear cutting tool illustrated may be employed in cutting straight bevel gears.

Metal cutting materials are known which are much harder than high-speed steel as, for instance, tungsten carbide which is just below the diamond in hardness. Materials like tungsten carbide are either too expensive or lack strength, toughness, so that it is impractical to make up a cutting tool of such materials alone. To provide the requisite strength and at the same time to reduce the cost of the resulting tool, it has already been proposed to make tools in which the hard, expensive cutting material is in the form of a small bit and this bit is secured in a suitable holder of a softer, tougher and less expensive metal. The purpose of the present invention is to provide an improved form of cutting tool in which a cutting bit is used as the cutting element and, through an improved method of mounting, is held rigidly against movement in its holder. In particular, the purpose of the invention is to provide a cutting tool of the type described which will be suitable for use in gear cutting and especially in roughing straight bevel gears with a reciprocating motion.

Referring now to the drawing, 10 indicates the holder which, in general, may have the same shape as the high speed tools heretofore used so that the tools can be employed on existing machinery. Thus, the holder 10 may have a shank portion 11 and a blade portion 12. The shank portion 11 may be provided with the usual bolt holes 13 through which bolts 14 may be passed to secure the tool to the tool block of a gear cutting machine, as shown in Figure 6.

The blade portion 12 of the holder is provided with a pocket 14 adapted to receive the cutting bit or, if desired, pockets may be formed in the blade portion of the holder at opposite ends thereof, as shown in the drawing, so that two bits can be mounted in the same holder and the tool inverted end for end and changed from one block to the other when one bit is dull or is worn down. The construction shown in the drawing is preferred because of its economy.

The cutting bits 15 are made of a high grade cutting material, such as tungsten carbide, which because of its cost or its brittleness cannot be used practically alone but which makes an efficient tool when mounted in a suitable holder or body. The cutting bits 15 are properly shaped for the purpose for which they are intended. Thus, in a gear cutting tool, the sides of the cutting bits will be inclined to each other to provide side cutting edges which are inclined to one another at an angle determined by the pressure angle of the gear to be cut.

At the present time, it is the usual practice to make high speed steel tools, which are to be used like the tools shown in the drawing, with one side 17 perpendicular to the base 18 of the tool and inclined only at its upper cutting portion 19, the portion 19 serving with the corresponding portion of the side 20 of the blade to form the effective cutting portion of the tool. For convenience, this shape may be adhered to in the manufacture of a tool according to this invention and the holder 10 and cutting bits 15 shaped accordingly. To fit the standard shape of blade, then, the cutting bits 15 will have one side 22 inclined at an acute angle to its base 23 and the other side 24 perpendicular to the base 23 for the greatest portion of its length and inclined only at its upper end 25 at an acute angle to the base. The depth of the portion 25 of the bit is equal to, at least, the greatest depth which the tool will be called upon to cut and the sides 25 and 22 include between them an angle equal to twice the pressure angle of the gear to be cut.

The primary feature of this invention is the manner in which the cutting bit or bits is or are secured in the pocket or pockets 14 in the holder. The rear wall of each pocket is V-shaped, so formed by the converging surfaces 27 and 28. These surfaces are inclined rearwardly from the tip of the tool inwardly. The pocket or pockets are formed a sufficient distance back of the end face or faces of the holder to leave in each case a retaining tongue 30. The rear face of this tongue, like the front face 31 of the bit is inclined rearwardly from its tip inwardly at an angle corresponding to the front rake angle of the cutting bit. The angle of rearward inclination of the faces 27 and 28 may be the same as the front rake angle of the cutting bit or different therefrom. If it is greater than the front rake angle of the cutting bit, then the cutting bit will be held between the rear wall of the pocket and the tongue 30 as though dove-tailed into the pocket.

If the tool is shaped in the manner shown in the drawing, it is preferred that the line 32 marking the vertex of the V formed by the surfaces 27 and 28 should intersect the tip of the blade portion of the tool at the point of intersection of the tip 33 with the side 20. This makes a more rigid construction, particularly if the tool is of fine point-width.

The cutting bit is shaped to fit exactly in the pocket 14, its rear face being V-shaped and formed by the surfaces 34 and 35, these surfaces 34 and 35 being inclined rearwardly of the tip 36 of the bit at an angle which may be equal to the angle of inclination of the front face of the bit to the tip 36 or different therefrom corresponding to the shape of the pocket. The bit may be brazed or welded into its pocket or the mechanical bond formed by the interengaging surfaces of the bit may be relied upon entirely to secure the bit in its pocket. It is to be noted that by reason of the V-shape of the rear walls of the pocket and bit, the bit is held against sidewise movement in either direction in the pocket and by reason of the rearward inclination of these walls, any cutting thrust on the bit serves only to seat the bit more securely in its pocket. The tongue 30 holds the bit against forward movement as the rear walls of the pocket hold it against rearward movement. Thus, the cutting bit is held very rigidly and securely in its pocket. Tungsten carbide and similar materials lend themselves particularly well to the construction described as cutting bits of such material can be readily molded to any desired shape.

Figure 6 shows how the tool described may be used. It shows a tool mounted in the tool block of a bevel gear generator of the type described in U. S. Patent No. 1,660,502 of February 28, 1928, issued to James E. Gleason et al. Here the tool is reciprocated back and forth to cut the tooth surfaces of a bevel gear blank G which is secured to the work spindle of the machine. The tool described is particularly suitable for the rough-cutting of such a gear blank, since though the pocket 14 must extend across the width of the blade portion of the tool so that the cutting bit can operate simultaneously upon the two adjacent side surfaces of a tooth groove, the bit is held securely in the pocket against sidewise movement and movement forward or backward. It is to be noted that the tool when mounted in the tool block is inclined to the direction of travel of the tool slide so that any cutting thrust on the tool acts only to seat the cutting bit more securely in its pocket.

While I have described a certain preferred embodiment of my invention and a particular use therefor, it will be understood that the invention is capable of further modifications and uses. In general, it may be said that this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the limits of the invention or the scope of the appended claims.

Having thus described my invention, what I claim is:

1. A gear cutting tool comprising a blade-body having a shank-portion adapted to be secured in a tool holder and a bit-holding portion formed integral with the shank-portion and adapted to extend beyond said holder, said bit-holding portion having side faces which converge in the direction of its tip and being formed with a transverse recess or pocket, a sufficient distance back of the front face of the bit-holding portion to leave a retaining tongue, and a cutting bit formed of a different material than the body and secured in said pocket, said cutting bit being formed with side and tip surfaces which are flush with the side and tip surfaces of the bit-holding portion behind the bit, and said pocket and said bit being formed with inter-engaging portions to hold said bit against sidewise movement in either direction relative to the bit-holding portion, said tongue preventing forward movement of the bit in the socket.

2. A gear cutting tool comprising a blade-body having a shank-portion adapted to be secured in a tool holder and a bit-holding portion formed integral with the shank-portion and adapted to extend beyond said holder, said bit-holding portion having side faces which converge in the direction of its tip and being formed with a transverse recess or pocket, the rear wall of which is inclined downwardly and rearwardly from the tip of the bit-holding portion, and a cutting bit of a different material secured in said pocket, said cutting bit being formed so as to closely fit said pocket and so that its side and tip surfaces are flush with the side and tip surfaces of the bit holding portion behind the bit, said bit-holding portion and bit being further formed with inter-engaging portions to hold said bit against sidewise movement in either direction relative to the bit-holding portion.

3. A gear cutting tool comprising a blade-body having a shank-portion adapted to be secured in a tool holder and a bit-holding portion formed integral with the shank-portion and adapted to extend beyond said holder, said bit holding portion having side faces which converge in the direction of its tip and being formed with a transverse recess or pocket a sufficient distance back of the front face of the bit-holding portion to leave a retaining tongue, said pocket being so formed that its rear wall is inclined downwardly and rearwardly from the tip of the bit-holding portion, and a cutting bit made of a different material from the blade-body and secured in said pocket, said cutting bit being formed so as to closely fit said pocket and so that its side and tip surfaces are flush with the side and tip surfaces of the bit-holding portion behind the bit.

4. A gear cutting tool comprising a blade-body having a shank-portion adapted to be secured in a tool holder and a bit-holding portion formed integral with the shank-portion and adapted to extend beyond said holder, said bit-holding portion having side faces which converge in the direction of its tip and being formed with a transverse recess or pocket, a sufficient distance back of the front face of the bit holding portion to leave a retaining tongue, said pocket being so formed that its rear wall is inclined downwardly and rearwardly from the tip of the bit-holding portion, and a cutting bit made of a different material from said blade-body and secured in said pocket, said cutting bit being formed so as to closely fit said pocket and so that its side and tip surfaces are flush with the side and tip surfaces of the bit-holding portion behind the bit, and said bit-holding portion and bit being further formed with inter-engaging portions adapted to hold the bit against sidewise movement in either direction in the pocket.

5. A gear cutting tool comprising a blade body having a shank portion adapted to be secured in the tool holder and a bit-holding portion formed integral with the shank-portion and adapted to extend beyond said holder, said bit holding portion having side faces which converge in the direction of its tip and being formed with a transverse recess or pocket a sufficient distance back of the front face of the bit holding portion to leave a retaining tongue, said pocket having its rear wall V-shaped and inclined downwardly and rearwardly from the tip of the bit holding portion, and a cutting bit made of a different material from the blade-body and secured in said pocket, said cutting bit being formed so as to closely fit said pocket and so that its side and tip surfaces are flush with the side and tip surfaces of the bit-holding portion behind the bit.

LEON D. SLADE.